June 18, 1929.  J. H. POWRIE  1,717,404
ART OF COLOR PHOTOGRAPHY
Original Filed March 16, 1920    4 Sheets-Sheet 1

Inventor
John H. Powrie
by his Attys:

June 18, 1929.  J. H. POWRIE  1,717,404
ART OF COLOR PHOTOGRAPHY
Original Filed March 16, 1920   4 Sheets-Sheet 2
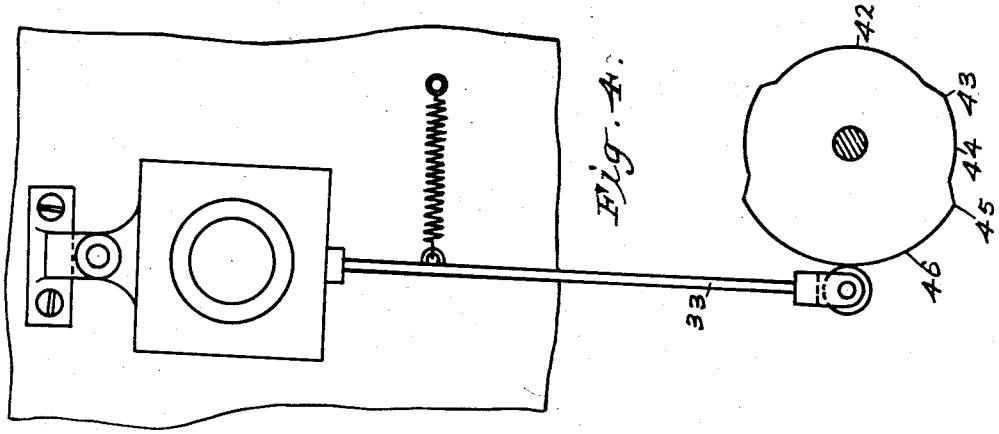
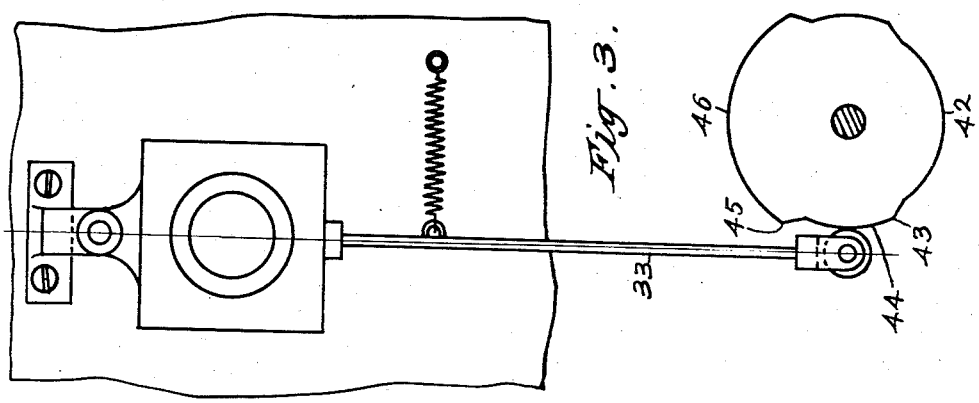
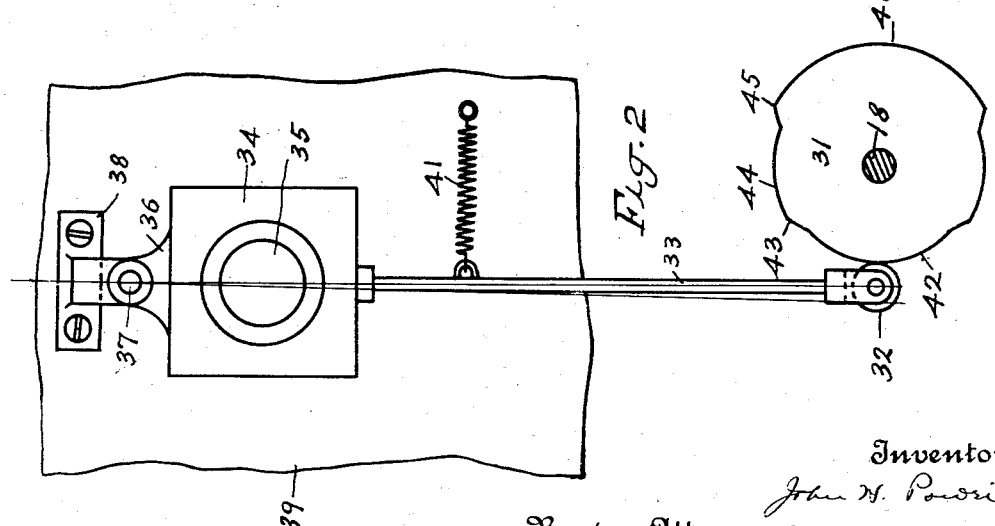
Inventor
John H. Powrie
By his Attorneys June 18, 1929.  J. H. POWRIE  1,717,404
ART OF COLOR PHOTOGRAPHY
Original Filed March 16, 1920   4 Sheets-Sheet 3

Inventor
John H. Powrie
By his Attorneys

June 18, 1929.  J. H. POWRIE  1,717,404
ART OF COLOR PHOTOGRAPHY
Original Filed March 16, 1920  4 Sheets-Sheet 4
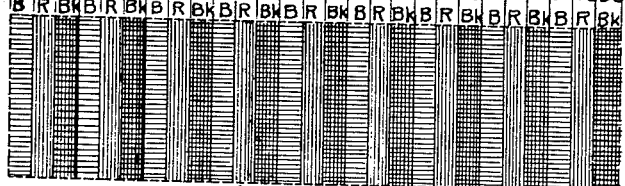
Fig. 7.
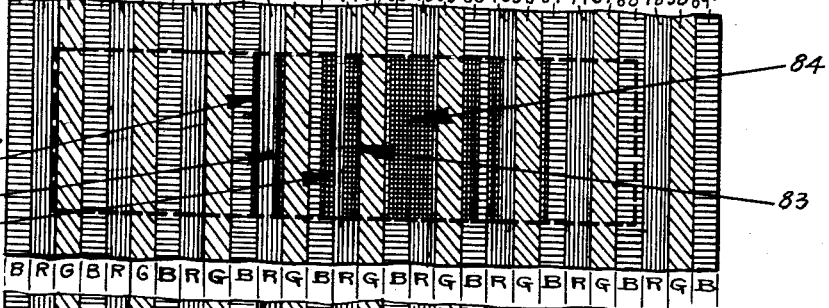
Fig. 8.
Fig. 9.
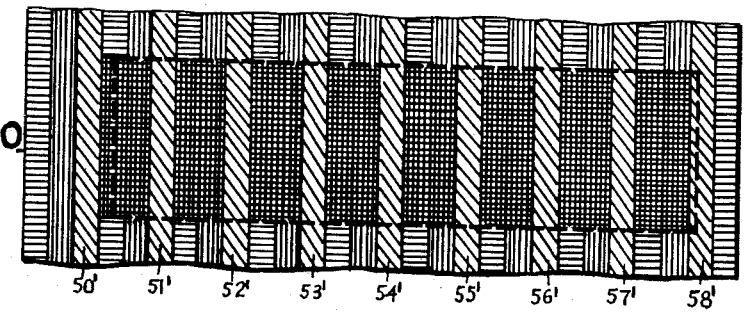
Fig. 10.
Inventor
John N. Powrie
By his Attorneys Patented June 18, 1929.

1,717,404

UNITED STATES PATENT OFFICE.

JOHN H. POWRIE, OF NEW YORK, N. Y.

ART OF COLOR PHOTOGRAPHY.

Original application filed March 16, 1920, Serial No. 366,198. Divided and this application filed September 30, 1926. Serial No. 138,585.

This invention relates to certain improvements in the art of color photography, and particularly to improvements in the production of positive images or pictures in natural colors on colored screen films of comparatively long length, and to methods of producing such positive films.

The subject matter of the present invention is a division of my prior Patent No. 1,605,062, dated November 2, 1926, filed March 16, 1920, which describes and claims broadly the production of a sensitive colored screen film having a regular recurring pattern of colored elements, and suitable for use either for taking negatives or for producing positives from such negatives.

Briefly the invention of my prior application, above referred to, consists in producing on a flexible support of substantial length, a color screen of suitable recurring elements, such as parallel lines colored in different colors, as red, blue and green, the colored elements being produced on one side of the film and a sensitive emulsion placed on the film over the colored elements.

It is the particular object of the present invention to produce positive pictures or images in natural colors on a sensitized support of considerable length having a colored screen produced thereon similar to the colored screen of the film on which the negative has been produced.

A further object of the present invention is to produce a method by which the positive pictures or images may be produced so that the screen pattern will be sufficiently fine as to be optically eliminated during projection at ordinary viewing distances, and so that in the printing of the positive image from the negative image the so-called moiré is eliminated and the positive will have sufficient luminosity for effective projection.

As is well known, the sensitiveness of a silver emulsion varies according to the size of the silver particles, and, generally speaking, the sensitiveness increases according to the increase in the size of the silver particles. Because of the necessary very great fineness of the colored elements of the screen, an emulsion fine enough to differentiate color in the image on such colored elements would be too slow for making certain classes of pictures, such, for instance, as commercial motion pictures. Such fineness, however, is necessary for projecting the positive by means of transmitted light, because it is necessary that the colored elements on the positive film should not be visible at ordinary viewing distances.

In the best practice of the present invention, the colored screen of both the negative and positive film strips is a regular recurring pattern of parallel lines, and in producing positives and negatives, therefore, on lined screen supports, the lines of the negative film will be made coarse as compared with the width of the lines on the positive screen film.

In actual practice in making a three color lined screen, therefore, the lines on the negative film are approximately nine hundred to the inch, widthwise of the film, that is, where three colors are employed, three hundred of each color, and the object to be photographed is taken and developed in the usual way on this screen film. In producing a positive film from this lined negative, it is desirable to have a sensitized film strip having a regular recurring pattern of lines, these lines, however, being finer than the lines on the negative. The relative fineness of these is a matter of choice, within certain limits. For instance, a screen having twenty-four hundred lines to the inch, that is, eight hundred to each of the three colors, is satisfactory, and a screen having a less number of lines, as fifteen hundred, having five hundred lines to the inch for each color will also produce satisfactory results. While these line numbers are given as examples, it will be understood that the number of lines may be varied from these examples within certain practical limits. Of course, it is not material in the practice of the invention that the negative film should be of the same width as the positive strip, as, for instance, the negative strip might be two inches wide and the positive strip an inch or a half inch in width.

Whereas in the best practice the negative and positive colored screens comprise regular recurring patterns of parallel lines, and, where the negative screen has nine hundred lines to the inch and the positive screen a greater number, it is practically certain that the lines will not register during the printing of the positive. Furthermore, if there is any angularity of the lines of the negative with respect to those of the positive, the technical effect of moiré is produced, which causes transverse bands to appear in the printed positive, which, of course, will render the positive useless.

In carrying out the invention, therefore, a novel method has been produced by which this moiré is eliminated and the positive is properly printed, irrespective of any difference in the number of the lines in the negative and positive screens, the method being such that the linear structure of the negative is optically eliminated in producing a positive, so that the printed positive when viewed by transmitted light will have the correct color value without there being any degradation due to the admixture of other colors, which would occur if the linear structures of the positive and negative films should overlap during the printing and so prevent a deposit of silver in the proper place on the positive film.

The method by which this is effected consists broadly in carrying out the printing process so that the image projected by the lens during the printing is moved or shifted, this movement varying with the period of the pattern of the negative screen. This movement of the image in effect duplicates or triplicates, as the case may be, the exposure of the image during printing, causing the deposition of silver and the consequent blocking out of the pattern on the positive at those points where certain unwanted colors would appear.

The specific embodiment of the method may take various forms as, for instance, this may be accomplished by moving the lens during the printing, or by shifting the negative or positive films. The same result can be produced by effecting the printing operation with the image slightly out of focus. One convenient way of producing the result desired, however, is by shifting the lens during the printing. Where the pattern of the screen film is a regular recurring pattern of three parallel lines, red, blue and green, the lens is shifted twice during the printing transverse to the run of the film, that is, it is shifted, assuming a green object to be pictured, the width of the blue line and then the width of the red line.

A convenient apparatus for producing this movement is shown in the accompanying drawings, and for clearness the various steps in the printing of a film where the lens is shifted are described.

Figures 2, 3 and 4 are diagrammatic layouts of the cam which may be employed for shifting the lens, the various figures showing the cam in different operative positions;

Figure 1:
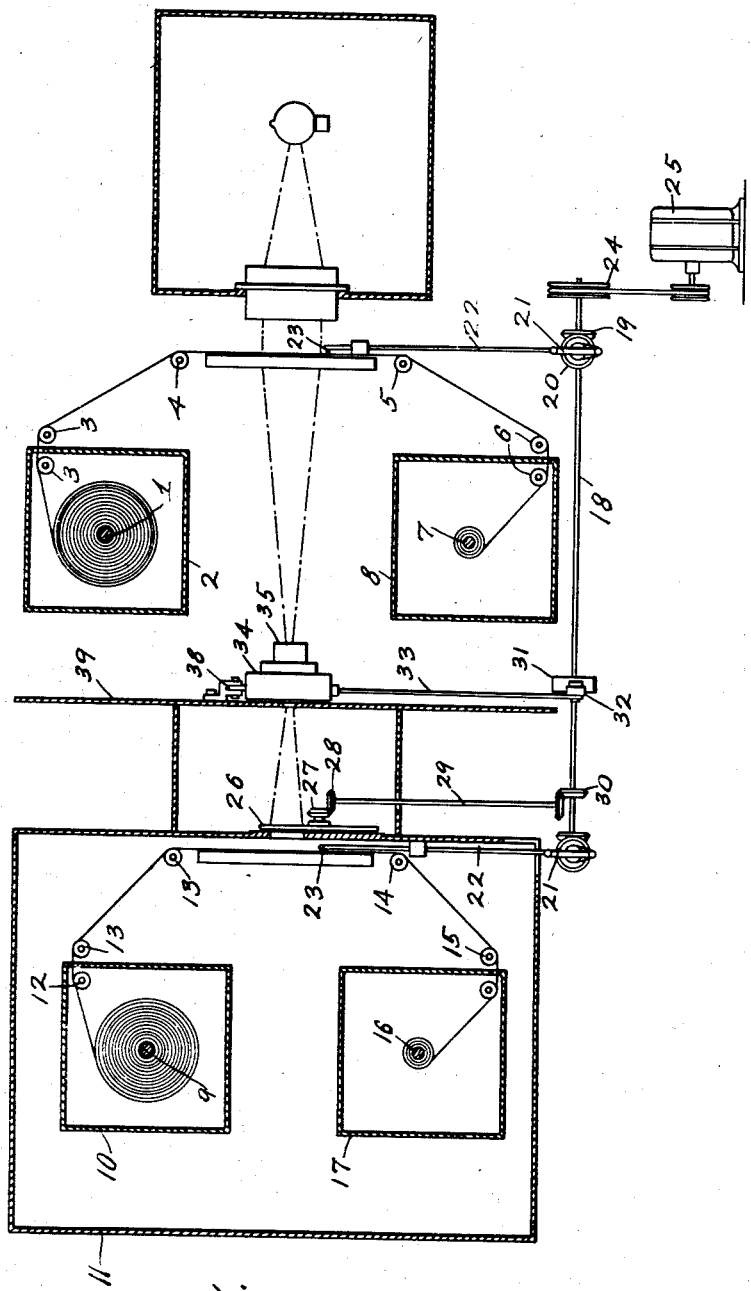
Figure 1 is a diagrammatic side view of an apparatus illustrating one method of producing positive pictures in natural colors on a film strip from a negative screen film.
Figure 5:
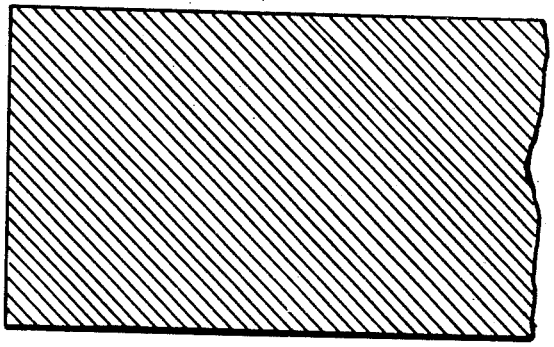
Figure 6:
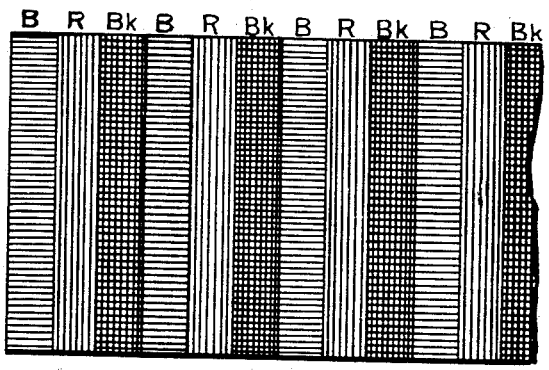

Figures 5 to 10 inclusive are views illustrating the relative positions of the lines during the printing operation, it being understood that these figures represent a single complete exposure. Of these figures, Fig. 5 is a diagrammatic expression of a part of a green object; Fig. 6 is a view of the image of Fig. 5 on a negative screen, using a linear pattern of nine hundred lines to the inch, the lines being red, blue and green, the green lines being here represented as exposed, that is, obscured by the silver deposit due to exposure; Fig. 7 is a diagrammatic expression of the image projected by the lines of the structure of Fig. 6, but reduced one-half diameter, that is, assuming the lines of Fig. 6 to be nine hundred to the inch, the lines of Fig. 7 are eighteen hundred to the inch; Fig. 8 is a diagrammatic view of a positive film strip in which the pattern is a recurring pattern of parallel lines of the three colors, red, blue and green, it being assumed that the lines in this positive are sixteen hundred to the inch, the image of Fig. 7 being indicated as superposed on this film in dotted lines, and as having had the first third of the exposure; Fig. 9 is a view similar to Fig. 8 showing the effect of the second third of the exposure, and Fig. 10 is a similar view showing the final exposure with the positive ready for viewing by transmitted light.

Referring now to these drawings and first to Figs. 1 to 4, the improved method has been shown as producing a continuous film positive from a continuous film negative in which the screen structures of both are parallel lines. It will be understood that the invention as to certain of its features is applicable to the production of positives of other types, and that the screen structure of the positive may vary from that of parallel lines, and that the invention, therefore, is not to be restricted to the production of a positive film. As shown in Figs. 1 to 4, however, there is provided a negative screen film provided with parallel colored lines on which it may be assumed that a picture has been taken, this film being carried on a spindle 1 suitably supported in a magazine 2. From the magazine 2, the film is guided over guide rolls 3, 4 to and past a printing light over guide rolls 5, 6 to a take-up spindle 7 suitably supported in a magazine 8. The positive film on which the picture is to be printed is a screen film of parallel lines and suitably sensitized. This film is supported on a spindle 9 suitably supported in a light tight magazine 10 which is secured in a housing 11 and is drawn from the magazine 10 over guide rolls 12, 13 past the printing light, and over guide rolls 14, 15 to a take-up spindle 16 in a magazine 17, also suitably supported in the housing 11. The negative film is drawn past the printing light by the usual intermittent feeding mechanism, which briefly includes a power shaft 18 provided with a gear 19 meshing with a gear 20, which in turn drives a crank arm 21 which carries a bar 22 having a claw 23 which engages the feeding notches in the edges of the film, as is well known.

The shaft 18 extends across the apparatus, and at its other end is provided with a similar film feeding device for feeding the positive film synchronously with the negative film. The shaft 18 may be driven in any suitable manner, as by a belt and pulley 24 driven from a motor 25.

A shutter 26 operates synchronously with the feeding mechanism of the positive film to expose the film at the proper intervals while the two films are at rest, this shutter 26 being driven in any suitable way, as by gears 27, 28 from a short vertical shaft 29 driven from a gear 30 on the power shaft 18, before referred to, from which shaft, as before described, the positive film feeding mechanism is also operated.

In accordance with the invention, the printing operation is conducted so that the lines of the negative film are optically eliminated and, in the particular construction shown in this application, this is effected by moving the lens during the exposure so as to effect a shifting or movement of the image while printing. The movement thus given the lens depends upon the linear structure of the negative film. Where as in the present instance a negative film is employed in which the linear structure consists of regular recurring periods each of three lines, the lens is shifted twice, that is, the width of two of the lines, and where these lines are, as in the present instance, nine hundred to the inch, this movement is one nine hundredth of an inch.

While this movement may be effected in various ways, in the particular construction illustrated, it is effected from a cam 31 on the power shaft 18, before referred to. This cam is shown in full lines in Figs. 2, 3 and 4 and, as there shown, the cam co-operates with a cam roll 32 carried on a rod 33. Mounted on this rod is a housing 34 in which is mounted the lens indicated at 35. This housing carries a projection 36 which is pivoted at 37 in a bracket 38 suitably supported to a face plate 39 of the dark chamber 40 of the printing mechanism. This cam is laid out, therefore, so as to shift the position of the lens relatively to the positive film during the printing operation and while the shutter is open, the lens being returned to normal position during the period that the shutter is closed, that is, the periods between the exposures on the positive film. The cam is laid out to effect this, as shown, in which, assuming the normal position is that shown in Fig. 2, the cam roll is held in engagement by a spring 41 with the face of the cam 42. During the first sixth revolution of this cam, no movement of the cam roll is effected. The cam is provided with an abrupt high point 43 which shifts the roll to the left, that is, to the position shown in Fig. 3, and the roll is held in this position by a face 44 during the second sixth revolution of the cam. At the end of this face 44 is a second abrupt point 45 which shifts the roll further to the left, that is, to the position shown in Fig. 4, the roll after shifting being held against a face 46 of the cam which holds it in the position of Fig. 4. During the third sixth revolution of the cam, the image is thus shifted the width of two lines during the printing, it being understood that during the second half of the revolution of the cam the shutter is closed and the roll is returned to the normal position of Fig. 2.

This shifting movement of the lens and consequently the image, results in the optical elimination of the lines, and the effect of this is shown diagrammatically in Figs. 7 to 10. In Fig. 7 is shown the image which is projected by the lens from the negative film, and, it being assumed that a green object has been photographed, the green lines numbered 50 to 58 inclusive are covered up with a deposit of silver, indicated by the letters BK, and shown as cross-hatched the blue lines numbered 60 to 68 inclusive, indicated by the letter B, and the red lines numbered 70 to 78 inclusive, indicated by the letter R, having been unaffected during the exposure of the object photographed.

It is assumed that this image has been reduced so that the lines are now eighteen hundred to the inch, and this image is projected on a positive film having say lines sixteen hundred to the inch. This positive film, Fig. 8, on which the image is to be printed, has in the particular instance shown a regular recurring pattern of parallel lines, the blue lines (B) being numbered 60' to 68', the red lines (R) being numbered 70' to 78', and the green lines 50' to 58'.

Referring now to a comparison of Figs. 7 and 8 and starting at the left hand side of these figures, it will be observed that during the printing no silver deposit will be formed on the lines 50', 61', 71', 51', 62', 72' and 52', it being understood, of course, that the printing is effected through the positive support and the colored lines carried thereby. The reason for the non-deposit of silver on these lines is because the blue, the red, and the black lines of the image of Fig. 7 come in such a relative position to the corresponding lines of the positive of Fig. 8 that no light is transmitted through these lines. When, however, blue line 63 is reached, a part of this line overlaps onto the blue line 63', so that light may pass through this overlapped portion with a consequent deposit of silver on the sensitive emulsion of the positive film, this being indicated by the narrow black line marked 80. The rest of the blue line 63, however, is intercepted by the red of red line 73' and consequently no silver is deposited on the positive at this point. However, red line 73 partly overlaps red line 73' so that light is permitted to pass through and a deposit is formed at the point marked 81. The rest of the red of line 73, however, is intercepted by the green line 53' so that no deposit is formed corresponding to the remainder of red line 73. The rest of the red line 73 and the black line 53 intercept the light so that no deposit is made at the point corresponding to green line 53' and part of blue line 64'.

Blue line 64 partly overlaps blue line 64' and a silver deposit is produced, indicated at 82. A part of blue line 64, however, is intercepted by red line 74' and no deposit is produced at that point. Red line 74, however, occupies a position so that the light passes through the major part of red line 74' and produces a deposit, indicated at 83. Green line 54' has no deposit of silver, as no light can pass through this line because of a part of red line 74 and and the silver deposit of black line 54. Blue line 65 and red line 75, however, occupy substantially the position of the corresponding blue and red lines 65' and 75' so that a deposit of silver 84 is produced at this point substantially the width of the two lines. Green line 55' is stopped out by black line 55 and part of blue line 66, so that no deposit is formed on this line and so on across the film. Figure 8 thus illustrates the printing for the first third of the printing operation. The lens is now shifted, as before described, the width of one line, so that the image is correspondingly shifted the width of one line and produces the result shown in Fig. 9. It will be seen that by reason of this shift a part of the blue line 60 has been shifted so as to overlap on the blue line 61', so that light may pass through these lines and form a deposit of silver, indicated by the numeral 85. The corresponding parts of other lines are thus brought into register so that light may pass through them and the film exposed, as shown in cross-hatching in Fig. 9. It will be observed that there are still transparent spaces of both red and blue, such as indicated by the numerals 86 and 87 in Fig. 9, the condition of the film being shown in this figure. The lens is again shifted the width of a line and the effect shown in Fig. 10 is produced, the remaining portions 85 and 86, of blue and red of Fig. 9, now being positioned so that light can pass through the lines and a deposit of silver formed. The lines corresponding to the red and blue lines, therefore, have been eliminated optically by the silver deposit indicated by black in the figure, leaving only the green line as a transparent portion of the positive film, so that when this positive is projected the green lines only permit the passage of the light.

It, of course, will be understood that the selection of an all green object is purely arbitrary, as the same result would follow with the blue lines and the red lines, a partial deposit of silver being formed, depending upon the colors of the object to be photographed, so that a true representation of the object photographed is produced in the finished film.

It will thus be seen that I have been able to produce a positive colored film of substantial length in which the printing is done from a colored screen negative, and in which the lines of the negative structure have been eliminated, and without moiré. While the method of doing this as described is a convenient one, other methods may be used for this purpose, and the invention, broadly considered, is not to be restricted to the specific method set forth.

What I claim is:

1. The method of printing a positive picture on a multi-color screen support in natural colors from a negative having a multi-color screen, which consists in effecting the exposure in steps, each step corresponding to one of the colors of the projected image, a relative movement between the positive support and the image projected thereon taking place between each step in such a way that the exposure on the sensitive surface of the positive is substantially the same throughout, and the structure of the negative screen is optically eliminated.

2. The method of printing a positive picture on a multi-color screen support in natural colors from a negative having a multi-color screen of parallel lines, which consists in effecting the exposure in steps, each step corresponding to the width of one of the color elements of the projected image, a relative movement between the positive support and the image projected thereon taking place between each step in such a way that the exposure on the sensitive surface of the positive is substantially the same throughout, and the line structure of the negative screen is optically eliminated.

3. The method of printing a positive picture in natural colors, which consists in the use of a multi-color screen support for the positive having a pattern of parallel lines, printing on this support from a negative having a multi-color pattern of parallel lines, and effecting the exposure in steps, each step corresponding to the width of one of the color elements of the projected image, a relative movement between the positive support and the image projected thereto taking place between each step in such a way that the exposure on the sensitive surface of the positive is substantially the same throughout, and the line structure of the negative screen is optically eliminated.

4. The method of printing a positive picture in natural colors, which consists in the use of a multi-color screen support for the positive having a pattern of parallel lines, printing on this support through a lens from a negative having a multi-color pattern of parallel lines of a different number to those of the positive support, and effecting the exposure in steps, each step corresponding to the width of one of the color elements of the projected image, a relative movement between the positive support and the image projected thereon taking place between each step in such a way that the exposure on the sensitive surface of the positive is substantially the same throughout, and the line structure of the negative screen is optionally eliminated.

5. The method of printing a positive picture in natural colors, which consists in the use of a multi-color screen support for the positive having a pattern of parallel lines, printing on this support through a lens from a negative having a multi-color pattern of parallel lines of a less number than those of the positive support and effecting the exposure in steps, each step corresponding to the width of one of the color elements of the projected image, a relative movement between the positive support and the image projected thereon taking place between each step in such a way that the exposure on the sensitive surface of the positive is substantially the same throughout, and the line structure of the negative screen is optically eliminated.

6. The method of printing a positive picture in natural colors, which consists in the use of a multi-color screen support for the positive having a pattern of parallel lines approximately twenty-four hundred to the inch widthwise of the support, printing on this support through a lens from a negative having a multi-color pattern of parallel lines approximately nine hundred to the inch widthwise of the negative and effecting the exposure in steps, each step corresponding to the width of one of the color lines of the projected image, a relative movement between the positive support and the image projected thereon taking place between each step in such a way that the exposure on the sensitive surface of the positive is substantially the same throughout, and the line structure of the negative screen is optically eliminated.

7. The method of printing a positive picture in natural colors, which consists in the use of a continuous film having a pattern of lines parallel with the length of the film, printing on this film through a lens from a continuous negative film having a multi-color pattern of lines parallel to the length of the negative film and effecting the exposure in steps, each step corresponding to the width of one of the color lines of the projected image, a relative movement between the positive film and the image projected thereon taking place between each step in such a way that the exposure on the sensitive surface of the positive is substantially the same throughout, and the line structure of the negative screen is optically eliminated.

8. The method of printing a positive picture in natural colors, which consists in the use of a multi-color screen support for the positive having a pattern of parallel lines, printing on this support through a lens from a negative having a multi-color pattern of parallel lines and effecting the exposure in steps, each step corresponding to the width of one of the color lines of the projected image and effecting a movement of the lens between each step to cause a movement of the projected image relatively to the positive support in such a way that the exposure on the sensitive surface of the positive is substantially the same throughout, and the line structure of the negative screen is optically eliminated.

9. In a method of printing a positive picture in natural colors on a positive support having a multi-color screen from a negative having a pattern of parallel lines forming a color screen, the step which consists in effecting the exposure in periods, each period corresponding to the width of one of the lines of the image projected on the positive support.

10. A method of printing a positive picture in natural colors, which consists in the use of a multi-color screen support for the positive printing on this support from a photograph produced on a screen having a multi-color pattern of parallel lines, effecting the exposure in steps, each step corresponding to one of the colors of the projected image, a relative movement between the positive support and the image projected thereon taking place between each step in such a way that the exposure on the sensitive surface of the positive is substantially the same throughout, and the structure of the negative screen is optically eliminated.

In testimony whereof, I have hereunto set my hand.

JOHN H. POWRIE.